(12) United States Patent
Zhang et al.

(10) Patent No.: US 9,828,278 B2
(45) Date of Patent: *Nov. 28, 2017

(54) METHOD AND APPARATUS FOR SEPARATION OF STRENGTHENED GLASS AND ARTICLES PRODUCED THEREBY

(71) Applicant: ELECTRO SCIENTIFIC INDUSTRIES, INC., Portland, OR (US)

(72) Inventors: Haibin Zhang, Portland, OR (US); Qian Xu, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 497 days.

This patent is subject to a terminal disclaimer.

(21) Appl. No.: 14/094,656

(22) Filed: Dec. 2, 2013

(65) Prior Publication Data

US 2014/0093693 A1 Apr. 3, 2014
US 2017/0305780 A9 Oct. 26, 2017

Related U.S. Application Data

(63) Continuation-in-part of application No. 13/778,950, filed on Feb. 27, 2013, which is a continuation-in-part of application No. 14/033,368, filed on Sep. 20, 2013.

(Continued)

(51) Int. Cl.
*C03B 33/02* (2006.01)
*B23K 26/38* (2014.01)
(Continued)

(52) U.S. Cl.
CPC ...... *C03B 33/0222* (2013.01); *B23K 26/0006* (2013.01); *B23K 26/0087* (2013.01);
(Continued)

(58) Field of Classification Search
None
See application file for complete search history.

(56) References Cited

U.S. PATENT DOCUMENTS 3,287,200 A * 11/1966 Hess .................. C03B 27/03
351/159.57
4,702,042 A 10/1987 Herrington et al.
(Continued)

FOREIGN PATENT DOCUMENTS

CN 1657220 A 8/2005
CN 101073145 A 11/2007
(Continued)

OTHER PUBLICATIONS

Machine translation of Japanese Pat. Appl. Pub. No. 2001-274441, published Oct. 5, 2001.
(Continued)

*Primary Examiner* — Lisa Herring (57) ABSTRACT

Methods and apparatus for separating substrates are disclosed, as are articles formed from the separated substrates. A method of separating a substrate having first and second surfaces includes directing a beam of laser light to pass through the first surface and, thereafter, to pass through the second surface. The beam of laser light has a beam waist located at a surface of the substrate or outside the substrate. Relative motion between the beam of laser light and the substrate is caused to scan a spot on a surface of the substrate to be scanned along a guide path. Portions of the substrate illuminated within the spot absorb light within the beam of laser light so that the substrate can be separated along the guide path.

38 Claims, 5 Drawing Sheets

Related U.S. Application Data (60) Provisional application No. 61/732,856, filed on Dec. 3, 2012, provisional application No. 61/604,380, filed on Feb. 28, 2012, provisional application No. 61/705,559, filed on Sep. 25, 2012, provisional application No. 61/705,038, filed on Sep. 24, 2012.

(51) Int. Cl.

| | | |
|---|---|---|
| *B23K 26/40* | (2014.01) | |
| *B23K 26/00* | (2014.01) | |
| *C03C 23/00* | (2006.01) | |
| *B23K 26/06* | (2014.01) | |
| *B23K 26/364* | (2014.01) | |
| *B23K 26/082* | (2014.01) | |
| *B23K 26/0622* | (2014.01) | |
| *B23K 103/00* | (2006.01) | |

(52) U.S. Cl.
CPC ...... *B23K 26/0604* (2013.01); *B23K 26/0624* (2015.10); *B23K 26/082* (2015.10); *B23K 26/364* (2015.10); *B23K 26/40* (2013.01); *C03C 23/0025* (2013.01); *B23K 2203/50* (2015.10); *Y10T 428/24488* (2015.01)

(56) References Cited

U.S. PATENT DOCUMENTS

| | | |
|---|---|---|
| 4,828,900 A | 5/1989 | Mouly |
| 5,043,553 A | 8/1991 | Corfe et al. |
| 5,413,664 A | 5/1995 | Yagi et al. |
| 5,543,365 A | 8/1996 | Wills et al. |
| 5,609,284 A | 3/1997 | Kondratenko |
| 5,637,244 A | 6/1997 | Erokhin |
| 5,656,186 A | 8/1997 | Mourou et al. |
| 5,665,134 A | 9/1997 | Kirby et al. |
| 5,826,772 A | 10/1998 | Ariglio et al. |
| 5,973,290 A | 10/1999 | Noddin |
| 6,143,382 A | 11/2000 | Koyama et al. |
| 6,211,488 B1 | 4/2001 | Hoekstra et al. |
| 6,313,435 B1 | 11/2001 | Shoemaker et al. |
| 6,326,589 B1 | 12/2001 | Beersiek et al. |
| 6,333,485 B1 | 12/2001 | Haight et al. |
| 6,521,862 B1 | 2/2003 | Brannon |
| 6,634,186 B2 | 10/2003 | Abe |
| 6,642,476 B2 | 11/2003 | Hamann |
| 6,642,477 B1 | 11/2003 | Patel et al. |
| 6,756,563 B2 | 6/2004 | Gross et al. |
| 6,795,274 B1 | 9/2004 | Hsieh et al. |
| 6,809,291 B1 | 10/2004 | Neil et al. |
| 6,820,330 B1 | 11/2004 | Haba |
| 6,962,279 B1 | 11/2005 | Marek et al. |
| 6,992,026 B2 | 1/2006 | Fukuyo et al. |
| 7,007,512 B2 | 3/2006 | Kamada et al. |
| 7,023,001 B2 | 4/2006 | Cournoyer et al. |
| 7,060,933 B2 | 6/2006 | Burrowes et al. |
| 7,169,687 B2 | 1/2007 | Li et al. |
| 7,217,448 B2 | 5/2007 | Koyo et al. |
| 7,378,342 B2 | 5/2008 | Kirby et al. |
| 7,605,344 B2 | 10/2009 | Fukumitsu |
| 7,723,212 B2 | 5/2010 | Yamamoto et al. |
| 8,075,999 B2 | 12/2011 | Barefoot et al. |
| 8,110,419 B2 | 2/2012 | Zehavi et al. |
| 8,383,983 B2 | 2/2013 | Lee et al. |
| 8,584,354 B2 | 11/2013 | Cornejo et al. |
| 8,609,512 B2 | 12/2013 | Pirogovsky et al. |
| 8,635,887 B2 | 1/2014 | Black et al. |
| 8,720,228 B2 | 5/2014 | Li |
| 8,932,510 B2 | 1/2015 | Li et al. |
| 2001/0035447 A1 | 11/2001 | Gartner et al. |
| 2001/0038930 A1 | 11/2001 | Yamamoto et al. |
| 2001/0040150 A1 | 11/2001 | Suzuki |
| 2002/0005805 A1 | 1/2002 | Ogura et al. |
| 2002/0033558 A1 | 3/2002 | Fahey et al. |
| 2002/0037132 A1 | 3/2002 | Sercel et al. |
| 2002/0041946 A1 | 4/2002 | Abe |
| 2002/0060978 A1 | 5/2002 | Hirotsune et al. |
| 2003/0044539 A1 | 3/2003 | Oswald |
| 2003/0096078 A1 | 5/2003 | Horisaka et al. |
| 2003/0102291 A1 | 6/2003 | Liu et al. |
| 2003/0111447 A1 | 6/2003 | Corkum et al. |
| 2003/0150839 A1 | 8/2003 | Kobayashi et al. |
| 2003/0201261 A1 | 10/2003 | Kang et al. |
| 2003/0217568 A1 | 11/2003 | Koyo et al. |
| 2004/0002199 A1 | 1/2004 | Fukuyo et al. |
| 2004/0089644 A1 | 5/2004 | Sekiya |
| 2004/0104846 A1 | 6/2004 | Ogura et al. |
| 2004/0200067 A1 | 10/2004 | Ogura et al. |
| 2005/0042805 A1 | 2/2005 | Swenson et al. |
| 2005/0087522 A1 | 4/2005 | Sun et al. |
| 2005/0184035 A1 | 8/2005 | Kurosawa et al. |
| 2005/0221044 A1 | 10/2005 | Gaume et al. |
| 2005/0223744 A1 | 10/2005 | Horisaka et al. |
| 2005/0230365 A1 | 10/2005 | Lei et al. |
| 2006/0021978 A1 | 2/2006 | Alexeev et al. |
| 2006/0049156 A1 | 3/2006 | Mulloy et al. |
| 2006/0091125 A1* | 5/2006 | Li ............... B23K 26/0622 219/121.69 |
| 2006/0127640 A1 | 6/2006 | Kobayashi et al. |
| 2006/0151450 A1 | 7/2006 | You et al. |
| 2006/0169677 A1 | 8/2006 | Deshi |
| 2007/0012665 A1 | 1/2007 | Nelson et al. |
| 2007/0039932 A1 | 2/2007 | Haase et al. |
| 2007/0170162 A1 | 7/2007 | Haupt et al. |
| 2007/0262464 A1 | 11/2007 | Watkins et al. |
| 2007/0272666 A1 | 11/2007 | O'Brien et al. |
| 2007/0272668 A1 | 11/2007 | Albelo et al. |
| 2007/0291496 A1 | 12/2007 | Nashner et al. |
| 2008/0047933 A1 | 2/2008 | Salminen et al. |
| 2008/0050888 A1 | 2/2008 | Garner et al. |
| 2008/0093775 A1 | 4/2008 | Menoni et al. |
| 2008/0128953 A1 | 6/2008 | Nagai et al. |
| 2008/0185367 A1 | 8/2008 | El-Hanany et al. |
| 2008/0283509 A1 | 11/2008 | Abramov et al. |
| 2008/0290077 A1 | 11/2008 | DeMeritt et al. |
| 2008/0296273 A1 | 12/2008 | Lei et al. |
| 2009/0020511 A1 | 1/2009 | Kommera et al. |
| 2009/0045179 A1 | 2/2009 | Williams |
| 2009/0201444 A1 | 8/2009 | Yamabuchi et al. |
| 2009/0212030 A1 | 8/2009 | Clifford, Jr. |
| 2009/0224432 A1 | 9/2009 | Nagatomo et al. |
| 2009/0242525 A1 | 10/2009 | O'Brien et al. |
| 2010/0025387 A1* | 2/2010 | Arai ............... B28D 5/00 219/121.69 |
| 2010/0147813 A1 | 6/2010 | Lei et al. |
| 2010/0197116 A1 | 8/2010 | Shah et al. |
| 2010/0206008 A1 | 8/2010 | Harvey et al. |
| 2010/0221583 A1 | 9/2010 | Foad et al. |
| 2010/0243626 A1 | 9/2010 | Baldwin |
| 2010/0291353 A1 | 11/2010 | Dejneka et al. |
| 2010/0301024 A1 | 12/2010 | Unrath |
| 2010/0320179 A1 | 12/2010 | Morita et al. |
| 2011/0003619 A1 | 1/2011 | Fujii |
| 2011/0049765 A1 | 3/2011 | Li et al. |
| 2011/0127242 A1 | 6/2011 | Li |
| 2011/0127244 A1 | 6/2011 | Li |
| 2011/0183116 A1* | 7/2011 | Hung ............... B24B 7/241 428/156 |
| 2011/0226832 A1 | 9/2011 | Bayne et al. |
| 2011/0240611 A1 | 10/2011 | Sandström |
| 2011/0240616 A1 | 10/2011 | Osako et al. |
| 2011/0240617 A1 | 10/2011 | Xu et al. |
| 2011/0250423 A1 | 10/2011 | Fukasawa et al. |
| 2011/0259631 A1 | 10/2011 | Rumsby |
| 2011/0266264 A1 | 11/2011 | Rumsby |
| 2011/0318996 A1 | 12/2011 | Okafuji et al. |
| 2012/0052252 A1 | 3/2012 | Kohli et al. |
| 2012/0061361 A1 | 3/2012 | Usuda et al. |
| 2012/0135177 A1 | 5/2012 | Cornejo et al. |
| 2012/0135195 A1* | 5/2012 | Glaesemann ....... B23K 26/073 428/156 |
| 2012/0145331 A1* | 6/2012 | Gomez ............... C03B 33/0222 156/712 |
| 2012/0168412 A1 | 7/2012 | Hooper |

(56) References Cited

U.S. PATENT DOCUMENTS

| | | | |
|---|---|---|---|
| 2012/0196071 A1 | 8/2012 | Cornejo et al. | |
| 2012/0211923 A1 | 8/2012 | Garner et al. | |
| 2012/0328905 A1* | 12/2012 | Guo | B23K 26/0084 428/687 |
| 2013/0037992 A1 | 2/2013 | Milshtein et al. | |
| 2013/0129947 A1 | 5/2013 | Harvey et al. | |
| 2013/0155004 A1 | 6/2013 | Yoshikawa | |
| 2013/0192305 A1 | 8/2013 | Black et al. | |
| 2013/0221053 A1 | 8/2013 | Zhang | |
| 2013/0224439 A1 | 8/2013 | Zhang et al. | |
| 2013/0323469 A1* | 12/2013 | Abramov | C03B 33/0222 428/155 |
| 2013/0328905 A1* | 12/2013 | Iwata | G06T 5/008 345/589 |

FOREIGN PATENT DOCUMENTS

| | | | |
|---|---|---|---|
| CN | 100471609 C | 3/2009 | |
| CN | 101903301 A | 12/2010 | |
| CN | 102356050 A | 2/2012 | |
| CN | 102405520 A | 4/2012 | |
| CN | 101670487 B | 1/2013 | |
| DE | 10029110 B4 | 5/2006 | |
| DE | 102006046313 B3 | 1/2008 | |
| DE | 102007009786 A1 | 8/2008 | |
| EP | 321838 B1 | 2/1993 | |
| EP | 2096375 A1 | 2/2009 | |
| EP | 2371778 A1 | 3/2010 | |
| JP | 10128563 A * | 5/1998 | B23K 26/18 |
| JP | 11163403 A | 6/1999 | |
| JP | 2002192369 A | 7/2002 | |
| JP | 2002-241141 A | 8/2002 | |
| JP | 2002308637 A | 10/2002 | |
| JP | 2003-088976 A | 3/2003 | |
| JP | 2004299969 A | 10/2004 | |
| JP | 2005-81715 A | 3/2005 | |
| JP | 2005-088023 A | 4/2005 | |
| JP | 2005-144530 A | 6/2005 | |
| JP | 2007-290011 A | 11/2007 | |
| JP | 2007283318 A | 11/2007 | |
| JP | 2007319881 A | 12/2007 | |
| JP | 2009061462 A | 3/2009 | |
| JP | 2009-72829 A | 4/2009 | |
| JP | 2009280452 A | 12/2009 | |
| JP | 2010-142862 A | 7/2010 | |
| JP | 2011088179 A | 5/2011 | |
| JP | 2011-517299 A | 6/2011 | |
| JP | 2011-164508 A | 8/2011 | |
| JP | 2011164508 A | 8/2011 | |
| JP | 2011230940 A | 11/2011 | |
| JP | 2011251879 A | 12/2011 | |
| JP | 2012-096257 A | 5/2012 | |
| KR | 2010031462 A | 3/2010 | |
| KR | 2012015366 A | 2/2012 | |
| WO | WO0222301 A1 | 3/2002 | |
| WO | 03-002289 | 1/2003 | |
| WO | WO2008/108332 A1 | 9/2008 | |
| WO | WO2009/106582 A2 | 9/2009 | |
| WO | WO2010/096359 A1 | 8/2010 | |
| WO | WO2011/025903 A1 | 3/2011 | |
| WO | WO2011/025908 A1 | 3/2011 | |
| WO | WO2011117006 A1 | 9/2011 | |

OTHER PUBLICATIONS

The Chinese office action for Chinese Patent Application No. 200980153523.7 dated Jan. 8, 2014, 7 pages.
The Chinese office action for Chinese Patent Application No. 200980153523.7 dated Jun. 5, 2013, 8 pages.
English translation of the Aug. 17, 2015 Office action concerning Chinese Patent Application No. 2009801535237,which corresponds with the subject U.S. Appl. No. 12/336,609.
English translation of the Mar. 3, 2016 Office action concerning Chinese Patent Application No. 201380009726.5, which corresponds with U.S. Appl. No. 138779,050.
English translation of the Feb. 22, 2016 Office action concerning Chinese Patent Application No. 200980153523.7, which corresponds with the subject U.S. Appl. No. 12/336,609.
English translation of the Mar. 17, 2016 Office action concerning Chinese Patent Application No. 201380049563.3, which corresponds with the subject U.S. Appl. No. 14/033,368.
Bradley Elkins Riley, "Evporative Etching for Non-Contact Glass Scribing Using a Single-Mode Ytterbium Fiber North Laser", North Carolina State University, 2007, 96 pages.
J. Zhang et al., "High-Speed Machining of Glass Materials by Laser-Induced Plasma-Assisted Ablation Using a 532-nm Laser", Appl. Phys. A 67, 499-501, 1998.
Loeschner, U., et al. "Micromachining of glass with short ns-pulses and highly repetitive fs-laser pulses." Proceedings of the ICALEO. 2008. 9 pages.
Beat Neuenschwander et al., "Processing of Metals and Dielectric Materials with PS-Laserpulses: Results, Strategies, Limitations and Needs" Proc. SPIE 7584, Laser Applications in Microelectronic and Optoelectronic Manufacturing XV, 75840R (Feb. 17, 2010); 14 pages.
M B Strigin, A N Chudinov, "Laser Processing of Glass by Picosecond Pulses", Quantum Electronics 24 (8) 732-735 (1994).
Lawrence Shah et al., "Femtosecond Laser Deep Hole Drilling of Silicate Glasses in Air", applied Surface Science, 2001, p. 151-164.
Rabia Qindeel et al., "IR Laser Plasma Interaction With Glass", American Journal of Applied Science 4 (12), 2007, pp. 1009-1015.
International search report of PCT/US2013/027947, 2 pages, dated May 31, 2013.
Anatoli A. Abramov et al., "Laser Separation of Chemically Strengthened Glass" Physics Procedia 5 (2010), 285-290. (6 pages).
Rico Bohme, "Laser-Induced Backside Wet Etching of Glasses and Crystals", Nov. 6, 2007. (130 pages).
Thomas Paul Dumont, et al., "Laser Interaction With Materials: From Transparent Materials to Thin Films", Swiss Federal Institute of Technology Zurich for the degree of Doctor of Natural Sciences, Diss. ETH No. 16620, year of 2006. (162 Pages).
Kunihito Nagayama et al. (2011), Pulse Laser Ablation by Reflection of Laser Pulse at Interface of Transparent Materials, Lasers—Applications in Science and Industry, Dr Krzysztof Jakubczak (Ed.), ISBN: 978-953-307-755-0, InTech, Available from: http://www.intechopen.com/books/lasers-applications-in-science-and-industry/pulse-laser-ablation-bvreflectionof-laser-pulse-at-interface-of-transparent-materials (21 pages).
Y. Hanada et al., "Laser-Induced Plasma-assisted Ablation (LIPAA): Fundamental and Industrial Applications", High- Power Laser Ablation VI, Proc. of SPIE vol. 6261, 626111-1 to-15 (2006). (15 pages).
Written Opinion of PCT/US2013/027947, May 31, 2013 (7 pages).
English translation of the Aug. 1, 2016 Office action concerning Chinese Patent Application No. 201380009749.6, which corresponds with the U.S. Appl. No. 13/779,183.
English translation of the Aug. 30, 2016 Office action concerning Taiwan Patent Application No. 102107470, which corresponds with the U.S. Appl. No. 13/779,183.
English translation of the Jun. 17, 2016 Office action concerning Chinese Patent Application No. 201380009631.3 which corresponds with the related U.S. Appl. No. 13/778,950.
English translation of the Jul. 20, 2016 Office action concerning Chinese Patent Application No. 201380009726.5 which corresponds with the U.S. Appl. No. 13/779,050.
English translation of the Feb. 7, 2017 Office action concerning Japanese Patent Application No. 2014-559964, which corresponds with the subject U.S. Appl. No. 13/778,950, 4pages.
English translation of the Jun. 27, 2017 Office action concerning Japanese Patent Application No. 2015-533250. 10 pages.

\* cited by examiner

METHOD AND APPARATUS FOR SEPARATION OF STRENGTHENED GLASS AND ARTICLES PRODUCED THEREBY

CROSS-REFERENCE TO RELATED APPLICATIONS

This application claims priority from U.S. patent application Ser. No. 13/778,950, filed Feb. 27, 2013, which claims priority from U.S. Provisional Application No. 61/604,380, filed Feb. 28, 2012; from U.S. patent application Ser. No. 14/033,368, filed Sep. 20, 2013, which claims priority from U.S. Provisional Application No. 61/705,559, filed Sep. 25, 2012 and from U.S. Provisional Application No. 61/705,038, filed Sep. 24, 2012 ; and from U.S. Provisional Application No. 61/732,856, filed Dec. 3, 2012, each of which is hereby incorporated by reference in its entirety.

COPYRIGHT NOTICE

© 2013 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

Embodiments of the present invention relate generally to methods for separating substrates of glass and, more specifically, to methods for separating strengthened glass substrates. Embodiments of the present invention also relate to apparatuses for separating substrates of glass, and to pieces of glass that have been separated from substrates of glass.

BACKGROUND

Thin strengthened glass substrates, such as chemically- or thermally-strengthened substrates have found wide-spread application in consumer electronics because of their excellent strength and damage resistance. For example, such glass substrates may be used as cover substrates for LCD and LED displays and touch applications incorporated in mobile telephones, display devices such as televisions and computer monitors, and various other electronic devices. To reduce manufacturing costs, it may be desirable that such glass substrates used in consumer electronics devices be formed by performing thin film patterning for multiple devices on a single large glass substrate, then sectioning or separating the large glass substrate into a plurality of smaller glass substrates using various cutting techniques.

However, the magnitude of compressive stress and the elastic energy stored within a central tension region may make cutting and finishing of chemically- or thermally-strengthened glass substrates difficult. The high surface compression and deep compression layers make it difficult to mechanically scribe the glass substrate as in traditional scribe-and-bend processes. Furthermore, if the stored elastic energy in the central tension region is sufficiently high, the glass may break in an explosive manner when the surface compression layer is penetrated. In other instances, the release of the elastic energy may cause the break to deviate from a desired separation path. Accordingly, a need exists for alternative methods for separating strengthened glass substrates.

DETAILED DESCRIPTION OF THE ILLUSTRATED EMBODIMENTS

The invention is described more fully hereinafter with reference to the accompanying drawings, in which example embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

In the following description, like reference characters designate like or corresponding parts throughout the several views shown in the figures. As used herein, the singular forms "a," "an" and "the" are intended to include the plural forms as well, unless the context clearly indicates otherwise. It will also be understood that, unless otherwise specified, terms such as "top," "bottom," "outward," "inward," and the like, are words of convenience and are not to be construed as limiting terms. In addition, whenever a group is described as "comprising" at least one of a group of elements and combinations thereof, it is understood that the group may comprise, consist essentially of, or consist of any number of those elements recited, either individually or in combination with each other. Similarly, whenever a group is described as "consisting" of at least one of a group of elements or combinations thereof, it is understood that the group may consist of any number of those elements recited, either individually or in combination with each other. Unless otherwise specified, a range of values, when recited, includes both the upper and lower limits of the range, as well as any sub-ranges therebetween.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Figure 1A:
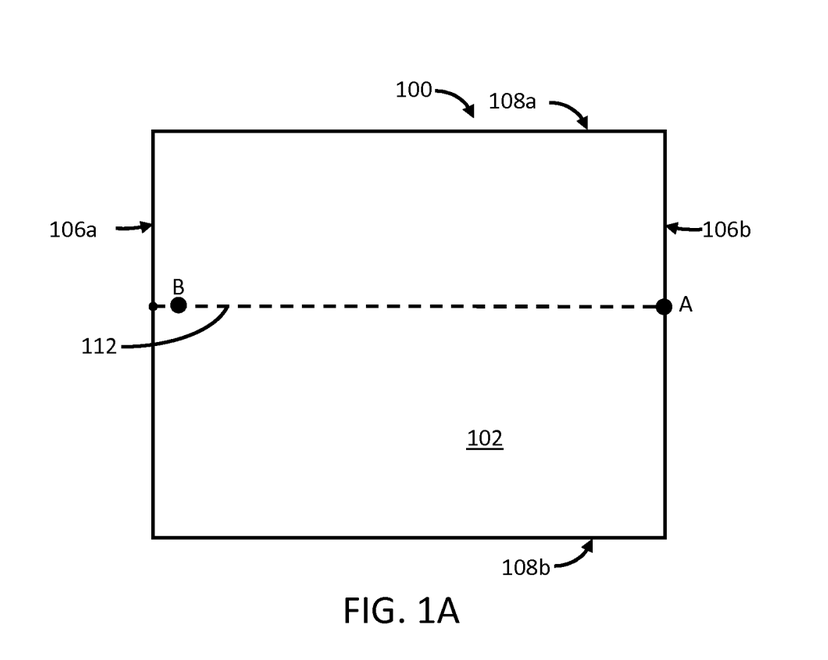
FIGS. 1A and 1B are top plan and cross-section views, respectively, illustrating a strengthened glass substrate capable of being separated according to exemplary embodiments.
Figure 1B:
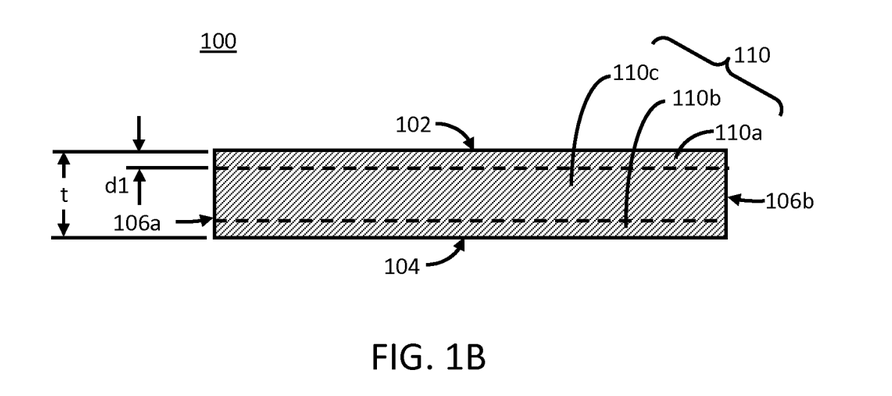

FIGS. 1A and 1B are top plan and cross-section views, respectively, illustrating a strengthened glass substrate capable of being separated according to embodiments of the present invention.

Referring to FIGS. 1A and 1B, a strengthened glass substrate 100 (also referred to herein simply as a "substrate") includes a first surface 102, a second surface 104 opposite the first surface, and edges 106a, 106b, 108a and 108b. Generally, the edges 106a, 106b, 108a and 108b extend from the first surface 102 to the second surface 104. Although the substrate 100 is illustrated as essentially square when viewed from a top plan view, it will be appreciated that the substrate 100 can be any shape when viewed from a top plan view. The substrate 100 can be formed from any glass composition including, without limitation, borosilicate glasses, soda-lime glass, aluminosilicate glass, alumino-borosilicate glass, or the like, or a combination thereof. The substrate 100 separated according to the embodiments described herein may be strengthened by a strengthening process such as an ion exchange chemical strengthening process, thermal tempering, or the like or a combination thereof. It should be understood that although embodiments herein are described in the context of chemically strengthened glass substrates, other types of strengthened glass substrates may be separated according the embodiments exemplarily described herein. Generally, the substrate 100 may have a thickness, t, greater than 200 µm and less than 10 mm. In one embodiment, the thickness, t, may be in a range from 500 µm to 2 mm. In another embodiment, the thickness, t, may be in a range from 600 µm to 1 mm. It will be appreciated, however, that the thickness, t, may be greater than 10 mm or less than 200 µm.

Referring to FIG. 1B, an interior 110 of the substrate 100 includes compression regions (e.g., first compression region 110a and second compression region 110b) and a tension region 110c. Portions of the substrate 100 within the compression regions 110a and 110b are kept in a compressive stress state that provides the glass substrate 100 its strength. The portion of the substrate 100 in the tension region 110c is under tensile stress to compensate for the compressive stresses in the compression regions 110a and 110b. Generally, the compressive and tensile forces within the interior 110 balance each other out so the net stress of the substrate 100 is zero.

As exemplarily illustrated, the first compression region 110a extends from the first main surface 102 toward the second main surface 104 by a distance (or depth) d1, and thus has a thickness (or "depth of layer", DOL) of d1. Generally, d1 can be defined as the distance from the physical surface of the substrate 100 to a point within the interior 110 where the stress is zero. The DOL of the second compression region 110b can also be d1.

Depending on process parameters such as composition of the substrate 100 and the chemical and/or thermal process by which the substrate 100 was strengthened, all of which are known to those skilled in the art, d1 can be generally greater than 10 µm. In one embodiment, d1 is greater than 20 µm. In one embodiment, d1 is greater than 40 µm. In another embodiment, d1 is greater than 50 µm. In yet another embodiment, d1 can even be greater than 100 µm. Moreover, d1 may be between any of the lesser of these values to any of the greater of these values. It will be appreciated that the substrate 100 can be prepared in any manner to produce a compression region with d1 less than 10 µm. In the illustrated embodiment, the tension region 110c extends to the edge surfaces 106a and 106b (as well as edge surfaces 108a and 108b). In another embodiment, however, additional compression regions can extend along edge surfaces 106a, 106b, 108a and 108b. These edge compression regions may exemplarily extend greater than 10 µm to greater than 100 µm from the edge surfaces 106a, 106b, 108a and 108b or greater than the intermediate distances between as discussed with respect to the compression region d1. Thus, collectively, the compression regions may form a compressively-stressed outer region extending from the surfaces of the substrate 100 into an interior of the substrate 100 and the tension region 110c, which is under a state of tension, is surrounded by compressively-stressed outer region.

Depending on the aforementioned process parameters, the magnitude of compressive stress in the compression regions 110a and 110b are measured at or near (i.e., within 100 µm) the first surface 102 and second surface 104, respectively, and can be greater than 69 MPa. For example, in some embodiments the magnitude of compressive stresses in the compression regions 110a and 110b can be greater than 100 MPa, greater than 200 MPa, greater than 300 MPa, greater than 400 MPa, greater than 500 MPa, greater than 600 MPa, greater than 700 MPa, greater than 800 MPa, greater than 900 MPa, or even greater than 1 GPa. Moreover, the magnitude of compressive stresses may be between any of the lesser of these values to any of the greater of these values. The magnitude of tensile stress in the tension region 110c can be obtained by the following:

$$CT = \frac{CS \times DOL}{t - 2 \times DOL}$$

where CT is the central tension within the substrate 100, CS is the maximum compressive stress in a compression region(s) expressed in MPa, t is the thickness of the substrate 100 expressed in mm, and DOL is the depth of layer of the compression region(s) expressed in mm.

Having exemplarily described a substrate 100 capable of being separated according to exemplary embodiments, this detailed description now describes the exemplary embodiments of separating the substrate 100. Upon implementing these methods, the substrate 100 can be separated along a guide path such as guide path 112. Although guide path 112 is illustrated as extending in a straight line, it will be appreciated that all or part of the guide path 112 may extend along a curved line.

Figure 2A:
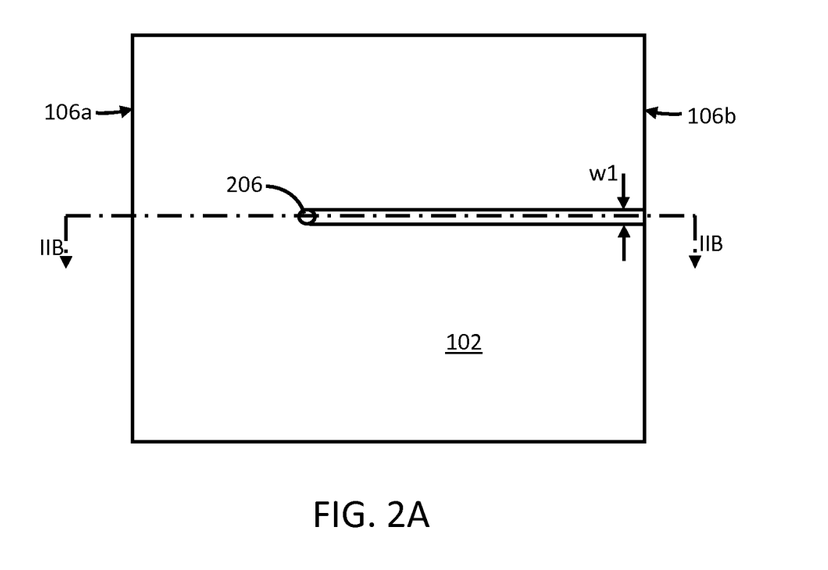
FIG. 2A is a plan view illustrating one embodiment of a process of forming a guide trench in the substrate exemplarily described with respect to FIGS. 1A and 1B.
Figure 2B:
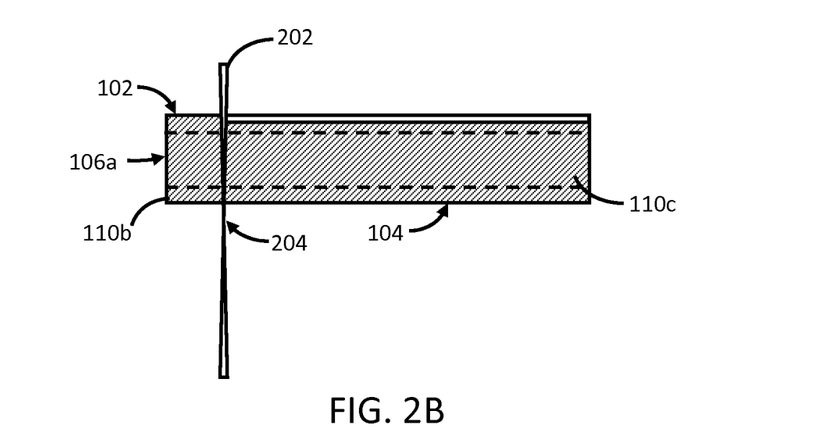
FIG. 2B is a cross-section view taken along line IIB-IIB of FIG. 2A.
Figure 3A:
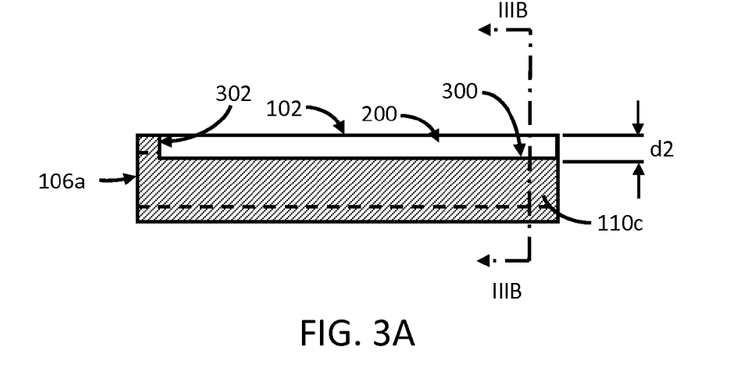
FIG. 3A is a cross-section view illustrating one embodiment of a guide trench formed according to the process exemplarily described with respect to FIGS. 2A and 2B.
Figure 3B:
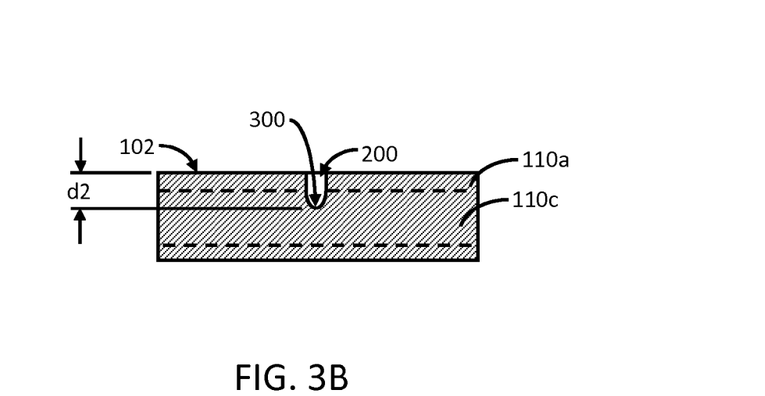
FIG. 3B is a cross-section view taken along line IIIB-IIIB of FIG. 3A.
Figure 4:
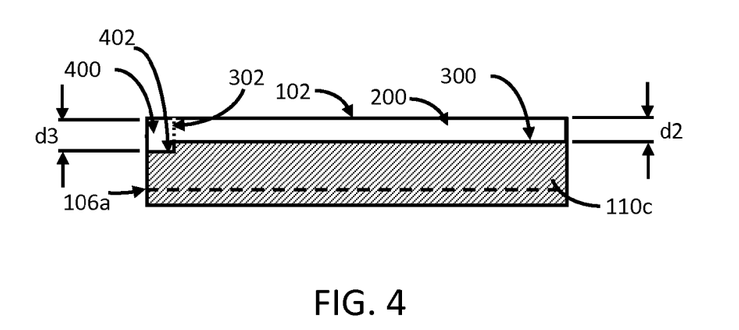
FIGS. 4 and 5 are cross-section views illustrating one embodiment of a process of separating a substrate along the guide trench exemplarily described with respect to FIGS. 2A-3B.
Figure 5:
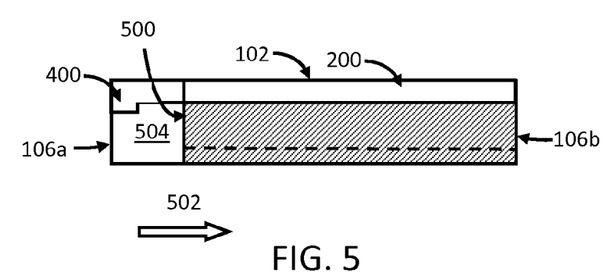

FIGS. 2A to 5 illustrate one embodiment of a process of separating a strengthened glass substrate such as substrate 100, which includes forming a guide structure (e.g., a guide trench) in the substrate 100 and then separating the substrate 100 along the guide trench. Specifically, FIGS. 2A and 2B are top plan and cross-section views, respectively, illustrating one embodiment of a process of forming the guide trench; FIGS. 3A and 3B are cross-section and side plan views, respectively, illustrating one embodiment of a guide trench formed according to the process exemplarily described with respect to FIGS. 2A and 2B; and FIGS. 4 and 5 are cross-section views illustrating one embodiment of a process of separating a substrate along the guide trench exemplarily described with respect to FIGS. 2A-3B.

Referring to FIGS. 2A and 2B, a guide trench (e.g., the guide trench 200 shown in FIGS. 3A and 3B) can be formed by directing a beam 202 of laser light onto the substrate 100 and then causing the beam 202 to be scanned relative to the substrate 100 between two points (e.g., points A and B, illustrated in FIG. 1A) along the guide path 112 at least once. As illustrated, point A is located at edge 106b and point B is spaced apart from the edge 106a. It will be appreciated that one or both of points may be located at a position different from that illustrated. For example, point B can be located at the edge 106a. FIGS. 2A and 2B illustrate the guide trench-forming process at a state in which the beam 202 has partially completed a first scan where the beam 202 is being scanned from point A to point B.

Generally, the beam 202 of laser light is directed onto the substrate along an optical path such that the beam 202 passes through the first surface 102 and, thereafter, through the second surface 104. In one embodiment, the light within the beam 202 is provided as a series of pulses of laser light and the beam 202 can be directed along the optical path by first producing a beam of laser light and then subsequently focusing the beam of laser light to produce the beam waist 204. In the illustrated embodiment, the beam waist 204 is located outside the substrate 100 such that beam waist 204 is closer to the second surface 104 than the first surface 102. By changing the manner in which the beam 202 is focused, however, the beam waist 204 can be provided closer to the second surface 104 than the first surface 102. In still other embodiments, the beam waist 204 can intersect the first surface 102 (so as to be at the first surface 102) or the second surface 104 (so as to be at the second surface 104).

When located outside the substrate 100, the beam waist 204 can be spaced apart from the substrate (e.g., when measured along the optical path) by a distance greater than 0.5 mm. In one embodiment, the beam waist 204 can be spaced apart from the substrate 100 by a distance less than 3 mm. In one embodiment, the beam waist 204 can be spaced apart from the substrate 100 by a distance of 1.5 mm within a range of plus or minus 0.5 mm or within a range of plus or minus 0.25 mm. It will be appreciated, however, that the beam waist 204 can be spaced apart from the substrate 100 by a distance greater than 3 mm or less than 0.5 mm. In some embodiments, the distance by which the beam waist 204 is spaced apart from the substrate 100 can be selected based on whether the beam waist 204 is closer to the first surface 102 or the second surface 104. As will be discussed in greater detail below, the distance by which the beam waist 204 is spaced apart from the substrate 100 can be selected based on the desired configuration of a guide trench used to aid in separation of the substrate 100.

Generally, light within the beam 202 of laser light has at least one wavelength greater than 100 nm. In one embodiment, light within the beam 202 of laser light can have at least one wavelength less than 3000 nm. For example, light within the beam 202 of laser light can have a wavelength of about 523 nm, 532 nm, 543 nm, or the like or a combination thereof. As mentioned above, light within the beam 202 is provided as a series of pulses of laser light. In one embodiment, at least one of the pulses can have a pulse duration greater than 10 femtoseconds (fs). In another embodiment, at least one of the pulses can have a pulse duration less than 500 nanoseconds (fs). In yet another embodiment, at least one pulses can have a pulse duration of about 10 picoseconds (ps) or a pulse duration of 10 ps within a range of plus or minus 250 fs or within a range of plus or minus 50 fs.

Moreover, the beam 202 may be directed along the optical path at a repetition rate greater than 10 Hz. In one embodiment, the beam 202 may be directed along the optical path at a repetition rate less than 100 MHz. In another embodiment, the beam 202 may be directed along the optical path at a repetition rate of about 400 kHz, at a repetition rate between 1 kHz and 1 MHz, or at repetition rate between 1 MHz and 50 MHz. It will be appreciated that the power of the beam 202 may be selected based on, among other parameters, the wavelength of light within the beam 202 and the pulse duration. For example, when the beam 202 has a green wavelength (e.g., 523 nm, 532 nm, 543 nm, or the like) and a pulse duration of about 10 ps, the power of the beam 202 may have a power of 20 W (or about 20 W). In another example, when the beam 202 has a UV wavelength (e.g., 355 nm, or the like) and a pulse duration of about less than 10 ns (e.g., 1 ns), the power of the beam 202 may have a power in a range from 10 W-20 W (or from about 10 W to about 20 W). It will be appreciated, however, that the power of the beam 202 may be selected as desired. Moreover, regardless of wavelength and pulse duration, the beam 202 may have a power in a range from 1 W to 40 W, a range of 5 W to 30 W, or a range of 5 W to 15 W.

Generally, parameters of the beam 202 (also referred to herein as "beam parameters") such as the aforementioned wavelength, pulse duration, repetition rate and power, in addition to other parameters such as spot size, bite size, spot intensity, fluence, or the like or a combination thereof, can be selected such that the beam 202 has an intensity and fluence in a spot 206 at the first surface 102 sufficient to ablate a portion of the substrate 100 illuminated by the spot 206 or to induce non-linear absorption (e.g., multiphoton absorption, avalanche absorption, or the like or a combination thereof) of light within the beam 202 by the portion of the first surface 102 illuminated by the spot 206. However by changing, for example, the manner in which the beam 202 is focused, the spot 206 can be moved to the second surface 104. Accordingly, a portion of the substrate 100 at the first surface 102 or the second surface 104 can be removed (e.g., by ablation, evaporation, etc.) or otherwise cracked when the portion is illuminated by the spot 206. To ensure consistency when initially processing either the first surface 102 or the second surface 104 in the avalanche-dominated absorption regime, a region of the surface to be processed can optionally be subjected to a pre-machining enhancement process as exemplarily described in U.S. Provisional Application No. 61/705,559, which is incorporated herein by reference in its entirety.

Referring to FIGS. 1A and 1B, the workpiece 100 is first subjected to a pre-machining enhancement process configured to facilitate subsequent laser-machining of the workpiece 100. In one embodiment, the pre-machining enhancement process facilitates subsequent laser-machining of the workpiece 100 by enhancing the uniformity of non-linear absorption of laser energy that is directed onto the workpiece 100 upon initiating the laser-machining process. Upon performing one or more pre-machining enhancement processes, an enhancement region is formed at a portion of the exterior surface of the workpiece 100. Although the enhancement region may occupy only a portion of the first major surface region 102, it will be appreciated that the enhancement region may occupy all of the first major surface region 102, and may further occupy all or part of any the second major surface region 104 as well as any of the side surface regions. It will be appreciated, however, that any number of discrete enhancement regions may be provided.

The pre-machining enhancement process can include generating free electrons at a region of the exterior surface of the workpiece 100 (e.g., at an enhancement region of the exterior surface), creating defects within the enhancement region of the exterior surface, modifying a composition of at least a portion of exterior surface within the enhancement region, modifying the surface morphology of at least a portion of exterior surface within the enhancement region, or the like or a combination thereof. It will be appreciated that selection of the particular pre-machining enhancement process to be performed and the characteristics of the selected pre-machining enhancement process will depend on the material within the enhancement region and the characteristics of the subsequent laser-machining process used to form a desired feature.

In one embodiment, one or more of any of the aforementioned pre-machining enhancement processes may be performed by introducing negatively charged ions (atomic or molecular) into the exterior surface, or into the interior 110 of the workpiece 100. The ions may be introduced by any suitable method including, for example, ion implantation, diffusion (e.g., from a liquid or a gas), or the like or a combination thereof.

In one embodiment, the surface morphology of the workpiece 100 may be modified by forming one or more cracks within the exterior surface of the workpiece 100, by chemically etching at least a portion of the exterior surface of the workpiece 100, by sputter etching at least a portion of the exterior surface of the workpiece 100, by mechanically abrading at least a portion of the exterior surface of the workpiece 100, or the like or a combination thereof. For example, one or more cracks may be formed by mechanically impacting the exterior surface of the workpiece 100 at a location within or near the enhancement region (e. g., with a cutting or scribing blade, or the like), by generating thermally induced tensile and/ or compressive stresses at a location within or near the enhancement region, by subjecting the workpiece 100 to a bending moment or other physical stress, by generating a region of laser-induced optical breakdown at a location within or near the enhancement region, or the like or a combination thereof. In another example, the chemical etching may involve a wet etching process, a dry etching process, or the like or a combination thereof, where the particular etchant used may depend on the material forming the enhancement region and the desired change in surface morphology. In embodiments in which the workpiece 100 is formed of unstrengthened or strengthened glass, the etchant may include hydrofluoric acidic, HNA (hydrofluoric acid/nitric acid/ acetic acid), or the like or a combination thereof. In another example, the sputter etching may involve any etching process involving momentum transfer between accelerated ions (either inert or reactive) and the workpiece 100. In another example, the mechanical abrading may involve any scuffing, scratching, wearing down, marring, rubbing away, or abrasive blasting (e.g., wet abrasive blasting, bead blasting, dry ice blasting, bristle blasting, or the like or a combination thereof), or the like or a combination thereof.

In another embodiment, the surface morphology of at least a portion of the exterior surface of the workpiece 100 may be modified by directing an energy beam onto at least a portion of the exterior surface. Examples of energy beams that may be directed in accordance with this embodiment include electron beams, ion beams, laser beams, or the like or a combination thereof.

Depending on the specific processes applied, the surface roughness of at least a portion of the exterior surface of the workpiece 100 may be desirably increased upon modifying the surface morphology of at least the portion of the exterior surface of the workpiece 100. It will be appreciated that the desired roughness to facilitate subsequent laser-machining can also depend upon the material from which the workpiece 100 is formed, the particular feature to be machined, the characteristics of the laser-based machining process, or the like or a combination thereof. For example, in embodiments in which the workpiece is formed of unstrengthened soda-lime glass, it is desirable for the enhancement region to have an Ra (avg) surface roughness value in a range between 2.0 µm and 9.0 µm, or an Rq (rms) surface roughness value in a range between 4.0 µm and 11.0 µm. Of course, the Ra and Rq values for the enhancement region may be higher than 9.0 µm and 11.0 µm, respectively, if desired. Results of experiments tend to indicate that the quality of laser-machined features increases as the surface roughness at the enhancement region increases. Generally, a relatively high-quality laser-machined feature will be associated will have relatively fewer and/or smaller surface chips (e.g., having, on average, a size of less than 40 µm, less than 30 µm, or less than 20 µm) in the exterior surface of the workpiece 100 surrounding the laser machined feature than a relatively low-quality laser-machined feature.

In embodiments in which the workpiece is formed of strengthened or unstrengthened glass, the enhancement region can be formed to have a desirable, consistent surface roughness when a laser beam is used to form the enhancement region during the pre-machining enhancement process. Parameters of the laser beam can be selected and controlled so that the laser beam irradiates a spot on the exterior surface of the workpiece 100 with laser energy having an intensity of over $10^{12}$ W/cm$^2$. Generally, parameters of the laser beam such as wavelength, pulse duration, pulse repetition rate, power, spot size, scan rate, can be selected and controlled as desired to achieve uniform surface roughening within the enhancement region. The wavelength of the laser beam can be in a range from 100 nm to 3000 nm (e.g., 355 nm, 532 nm, 1064 nm, or the like or a combination thereof). The pulse duration of the laser beam can be less than 1 ns (or less than about 1 ns). In one embodiment, the pulse duration of the laser beam can be less than 100 ps. In another embodiment, the pulse duration of the laser beam can be in a range from 10 ps to 15 ps. The pulse repetition rate of the laser beam can be in a range from 30 kHz to 1 MHz. In one embodiment, the pulse repetition rate of the laser beam can be in a range from 30 kHz to 500 kHz. In yet another embodiment, the pulse repetition rate of the laser beam can be 200 kHz. The spot size of the laser beam can be in a range from 3 pm to 50 pm. In one embodiment, the spot size of the laser beam can be 7 µm. Depending on the pulse repetition rate and spot size, the average power of the laser beam can be in a range from 0.5 W to 75 W. In one embodiment, the average power of the laser beam can be 2 W. Depending on the average power and spot size, the scan speed of the laser beam can be in a range from 100 mm/ s to 5000 mm/ s. In one embodiment, the scan speed of the laser beam can be 140 mm/s. One or more of the aforementioned laser beam parameters can be selected and controlled so that the laser beam irradiates the exterior surface of the workpiece at a pitch in a range from about 50% to about 70% of the spot size.

Having exemplarily described various embodiments of performing a pre-machining enhancement process, some exemplary pre-machining enhancement processes will now be described.

A pre-machining enhancement process can be performed, according to one embodiment, by directing a laser beam 202 from a laser system onto the exterior surface of the workpiece 100. The workpiece 100 can be oriented relative to the laser system such that the laser beam 202 impinges the first major surface region 102 at the enhancement region. The laser beam 202 may be focused at a beam waist 204 located either at or above the first major surface region 102 (e.g., so as to be located outside the workpiece 100) so that the laser beam 202 irradiates a spot at a portion of the first major surface region 102 with laser energy having a peak intensity sufficient to modify (e.g., increase) the surface roughness of the workpiece surface irradiated by the laser beam 202, thereby creating a roughened surface within the enhancement region. Parameters of this pre-machining enhancement process can be controlled to ensure that the roughened surface has a desired surface roughness. In one embodiment, the laser beam 202 may be scanned and/or the workpiece 100 may be translated to cause the spot to be moved along the exterior surface of the workpiece 100 within the enhancement region.

In one example embodiment, the aforementioned pre-machining enhancement process was performed by providing the workpiece as a piece of unstrengthened soda-lime glass and the laser 202 directed 10 ns pulses of green light onto the first major surface 102. The resultant roughened surface had surface roughness values of 8.5 μm (Ra) and 10.6 μm (Rq). A pre-machining enhancement process according to another embodiment wherein the laser beam 202 may be directed onto the workpiece 100 such that the laser beam 202 first impinges the first major surface region 102 and is then transmitted through the workpiece 100. The laser beam 202 is focused at a beam waist 204 located either at or below the second major surface region 104 (e.g., so as to be located outside the workpiece 100) so that the laser beam 202 irradiates a spot at a portion of the second major surface region 104 with laser energy having a peak intensity sufficient to modify (e. g., increase) the surface roughness of the workpiece surface irradiated by the laser beam 202, thereby creating the roughened surface at an enhancement region located at the second major surface region 104.

A pre-machining enhancement process according to another embodiment can be performed wherein a donor object may be disposed adjacent to the second major surface region 104 (e.g., such that a donor surface of the donor object abuts the second major surface region 104). In another embodiment, however, the donor object can be disposed adjacent to the second major surface region 104 so the donor surface is spaced apart from the second major surface region 104 (e.g., by a distance of 1 mm). In one embodiment, the donor object is a metallic object, and may include a metal such as aluminum or the like, a metal alloy such as an aluminum alloy, stainless steel, or the like or a combination thereof.

The laser beam 202 may be directed onto the workpiece 100 such that the laser beam 200 first impinges the first major surface region 102 and this then transmitted through the workpiece 100 and through the second major surface region 104 to impinge upon the donor object. The laser beam 202 may be focused at a beam waist 204 located either at or below the second major surface region 104 (e.g., so as to be located outside the workpiece 100) or so that the laser beam 202 irradiates a spot at a portion of the donor object with laser energy having a laser fluence and/or peak intensity sufficient to ablate, vaporize, ionize, boil, eject, free, or otherwise remove donor material (e.g., electrons, atoms, molecules, particles, etc.) the from the donor object. In one embodiment, the removal of donor material is effected such that the removed donor material impacts against, is implanted into, is diffused through, or is otherwise introduced to an enhancement region at the second major surface region 104 of the exterior surface of the workpiece 100. Upon introducing the donor material to the enhancement region at the second major surface region 104, one or more or all of the aforementioned pre-machining enhancement processes (e.g., generating free electrons at the enhancement region, creating defects within the enhancement region, modifying a composition of at least a portion of exterior surface within the enhancement region, modifying the surface morphology of at least a portion of exterior surface within the enhancement region, etc.) may be performed.

In one embodiment, the spot 206 can have a circular shape with a diameter greater than 1 μm. In another embodiment, the diameter of the spot 206 can be less than 100 μm. In yet another embodiment, the diameter of the spot 206 can be about 30 μm. In some embodiments, the diameter of the spot 206 can be between 10 μm and 50 μm, or between 20 μm and 40 μm. It will be appreciated, however, that the diameter can be greater than 100 μm or less than 1 μm. It will also be appreciated that the spot 206 can have any shape (e.g., ellipse, line, square, trapezoid, or the like or a combination thereof), and such shape may have major spatial axis. For convenience, the terms diameter and major spatial axis are used interchangeably.

Generally, the beam 202 can be scanned between the two points A and B along a guide path 112 at least once. In one embodiment, the beam 202 is scanned between the two points along the guide path at least 5 times. In another embodiment, the beam 202 is scanned between the two points along the guide path at least 10 times. In yet another embodiment, the beam 202 is scanned between the two points along the guide path for from 5 to 10 passes. Generally, the beam 202 can be scanned between the two points along a guide path 112 at a scan rate greater than or equal to 1 m/s. In another embodiment, the beam 202 is scanned between the two points along a guide path 112 at a scan rate greater than 2 m/s. It will be appreciated, however, that the beam 202 may also be scanned between the two points along the guide path 112 at a scan rate less than 1 m/s. For example, the beam 202 can be scanned at a scan rate at or within 2.5 mm/s of 80 mm/s, 75 mm/s, 50 mm/s, 30 mm/s, or the like. It will also be appreciated that the scan rate and the number of times the beam 202 is scanned between the two points A and B can be selected based on the aforementioned beam parameters, as well as desired depth of the guide trench 200 composition of the substrate, edge quality desired of pieces separated from the substrate 100.

Guide trench parameters such as the width (e.g., denoted at "w1 ", see FIG. 2A), depth (e.g., denoted at "d2 ", see FIG. 3A), location of an end of the guide trench 200, cross-sectional profile, and the like, can be selected by adjusting one or more scanning parameters, beam waist placement parameters and/or the aforementioned beam parameters. Exemplary scanning parameters include the aforementioned scan rate, number of times to scan between points A and B, or the like or a combination thereof. Exemplary beam waist placement parameters include whether or not the beam waist 204 is located outside the substrate 100 and how far the beam waist 204 is spaced apart from the substrate 100, whether or not the beam waist 204 is closer to the first surface 102 or the second surface 104, whether or not the beam waist 204 is at the first surface 102 or the second surface 104, or the like or a combination thereof. Upon completing the guide trench-forming process, a guide trench 200 is formed as shown in FIGS. 3A and 3B.

Referring to FIGS. 3A and 3B, the depth d2 of the guide trench 200 can be defined as the distance from the physical surface of the substrate 100 in which it is formed (e.g., the first surface 102, as exemplarily illustrated) to the lower surface 300 of the guide trench 200. Depending on the aforementioned beam parameters, scanning parameters, and beam waist placement parameters, d2 can be greater than d1, equal to d1 or less than d1. When d2 is greater than d1, d2 can be in a range of 5% (or less than 5%) to 100% (or more than 100%) greater than d1. Moreover, d2 can be in a range of 25% to 75% greater than d1 or in a range of 40% to 60% greater than d1. When d2 is less than d1, d2 can be in a range of 1% (or less than 1%) to 90% (or more than 90%) less than d1. Moreover, d2 can be in a range of 25% to 75% less than d1 or in a range of 40% to 60% less than d1. In one embodiment, the aforementioned beam parameters, scanning parameters, beam waist placement parameters, and the like, can be selected such that d2 can be greater than 30 µm. In another embodiment, d2 can be less than 50 µm. In still another embodiment, d2 can be about 40 µm, or 40 µm plus or minus 2.5 µm.

As shown in FIG. 3A, an end 302 of the guide trench 200 is spaced apart from the edge 106a of the substrate 100. The location of the end 302 within the substrate 100 corresponds to the location of point B shown in FIG. 1A. Thus if point B were relocated to the edge 106a, the end 302 of the guide trench 200 would coincide with the edge 106a (so as to be at the edge 106a).

Referring to FIG. 3B, the aforementioned beam parameters, scanning parameters, beam waist placement parameters, and the like, can be selected to adjust the radius of curvature of the lower surface 300 of the guide trench 200. Depending on the aforementioned beam parameters, scanning parameters, beam waist placement parameters, substrate parameters (e.g., substrate composition, compression region depth, magnitude of compressive stresses within a compression region, magnitude of tensile stresses within a tension region, or the like or a combination thereof), or the like or a combination thereof, guide trench parameters (e.g., the depth d2 of the guide trench 200, the radius of curvature of the guide trench 200, location of the end 302 of the guide trench 200 relative to the edge of the substrate 100, or the like) can be selected to promote desirable separation of the substrate 100 along the guide path 112. For example, if the depth d2 is too small and/or if the radius of curvature is too large, the substrate 100 may separate along a path that undesirably deviates away from the guide path 112, or may undesirably produce small cracks in the substrate 100 that can reduce the strength of pieces of strengthened glass that are separated from the substrate 100.

FIGS. 4 and 5 are cross-section views illustrating one embodiment of a process of separating a substrate along a guide trench as shown in FIGS. 2A-3B.

In one embodiment, the aforementioned guide trench parameters can be selected to ensure that the substrate 100 separates (e.g., along the guide trench 200) spontaneously upon formation of the guide trench 200. In the illustrated embodiment, however, the aforementioned guide trench parameters are selected such that the substrate 100 is prevented from spontaneously separating along the guide trench 200. In such embodiments, one or more additional processes can be performed to form a vent crack within the substrate 100 after the guide trench 200 is formed. The width, depth, size, etc., of such a vent crack can be selected and/or adjusted (e.g., based on the parameters of the one or more additional processes) to ensure that the substrate 100 can be separated along the guide path 112 upon forming the vent crack. Thus, the vent crack and the guide trench 200 can be configured such that the substrate 100 is separable along the guide path 112 upon forming the vent crack. The vent crack can be formed in any manner. For example, the vent crack can be formed by laser radiation onto the substrate 100, by mechanically impacting the substrate 100, by chemically etching the substrate 100, or the like or a combination thereof.

When forming the vent crack by directing laser radiation onto the substrate 100, the laser radiation can have at least one wavelength that is greater than 100 nm. In one embodiment, the laser radiation can have at least one wavelength that is less than 11 µm. For example, the laser radiation can have at least one wavelength that is less than 3000 nm. In another embodiment, the laser radiation has at least one wavelength selected from the group consisting of 266 nm, 523 nm, 532 nm, 543 nm, 780 nm, 800 nm, 1064 nm, 1550 nm, 10.6 µm, or the like. In one embodiment, the laser radiation can be directed into the guide trench 200, outside the guide trench 200, or a combination thereof. Similarly, the laser radiation can be directed at an edge of a surface of the substrate 100 or away from the edge. In one embodiment, the laser radiation can have a beam waist similar to the beam waist 200. Such a beam waist may be located outside the substrate 100 or be at least partially coincident with any portion of the substrate 100. When forming the vent crack by mechanically impacting the substrate 100, a portion of the substrate 100 can be mechanically impacted any suitable method (e.g., by hitting, grinding, cutting, or the like or a combination thereof). When forming the vent crack by chemically etching the substrate 100, a portion of the substrate 100 can be removed upon being contacted with an etchant (e.g., a dry etchant, a wet etchant, or the like or a combination thereof).

In other embodiments, the vent crack can be characterized as being formed by removing a portion of the substrate 100. With reference to FIG. 4, the vent crack according to one embodiment can be formed by removing a portion of the substrate 100 to form an initiation trench, such as initiation trench 400, along the guide path 112. Thus, the initiation trench 400 can be aligned with the guide trench 200. In another embodiment, however, the initiation trench 400 can be spaced apart from the guide path 112 so as not to be aligned with the guide trench 200. In such an embodiment, the initiation trench 400 is still sufficiently close to the guide path 112 to initiate a crack that can propagate to the guide trench 200.

In one embodiment, the initiation trench 400 and the guide trench 200 extend into the substrate 100 from the same surface (e.g., the first surface 102, as exemplarily illustrated). In the illustrated embodiment, the initiation trench 400 extends into the substrate 100 from the surface 102. In another embodiment however, the initiation trench 400 can extend into the substrate 100 from the guide trench 200 (e.g., from the lower surface 300 of guide trench 200). In the illustrated embodiment, the initiation trench 400 extends from the end 302 of the guide trench 200 along the guide path 112 (e.g., toward the edge 106b). In another embodiment however, the initiation trench 400 can extend along the guide path 112 from the edge 106a of the substrate 100, or can extend along the guide path 112 from any location of the guide path 200. A width of the initiation trench 400 can be greater than, less than or equal to the width, w1, of the of the guide trench 200. As exemplarily illustrated, the length of the initiation trench 400 (e.g., as measured along the guide path 112 shown in FIG. 1A) is less than the length of the guide trench 200 (e.g., as also measured along the guide path 112). In other embodiments, however, the length of the initiation trench 400 can be equal to or greater than the length of the guide trench 200.

As exemplarily illustrated, the initiation trench 400 extends to a depth d3 such that a lower surface 402 extends into the tension region 110c. In another embodiment, however, the initiation trench 400 can extend almost to tension region 110c or extend to a boundary between compression region 110a and tension region 110c. Similar to the depth d2, the depth d3 of the initiation trench 400 can be defined as the distance from the physical surface of the substrate 100 in which it is formed (e.g., the first surface 102, as exemplarily illustrated) to the lower surface 402 of the initiation trench 400. When greater than d1, d3 can be in a range of 5% (or less than 5%) to 100% (or more than 100%) greater than d1. When less than d1, d3 can be in a range of 1% (or less than 1%) to 90% (or more than 90%) less than d1. In one embodiment, the aforementioned beam parameters, scanning parameters, beam waist placement parameters, or the like, or a combination thereof can be selected such that d3 can be at least 20 µm, at least 30 µm, at least 40 µm, at least 50 µm, greater than 50 µm, less than 20 µm, or the like. In another embodiment, d3 can be about 40 µm or about 50 µm. The initiation trench 400 can be formed by any desired method. For example, the initiation trench 400 can be formed by directing laser radiation onto the substrate 100, by mechanically impacting the substrate 100 (e.g., by cutting, grinding, etc.), by chemically etching the substrate 100, or the like or a combination thereof.

Upon forming the vent crack, the vent crack spontaneously propagates along the guide trench 200 to separate the substrate 100 along the guide path 112. For example, and with reference to FIG. 5, a leading edge 500 of the vent crack can propagate in the direction indicated by arrow 502, along the guide trench 200. Reference numeral 504 identifies a new edge surface of a portion of the substrate 100 that has been separated along the guide path 112.

Figure 6A:
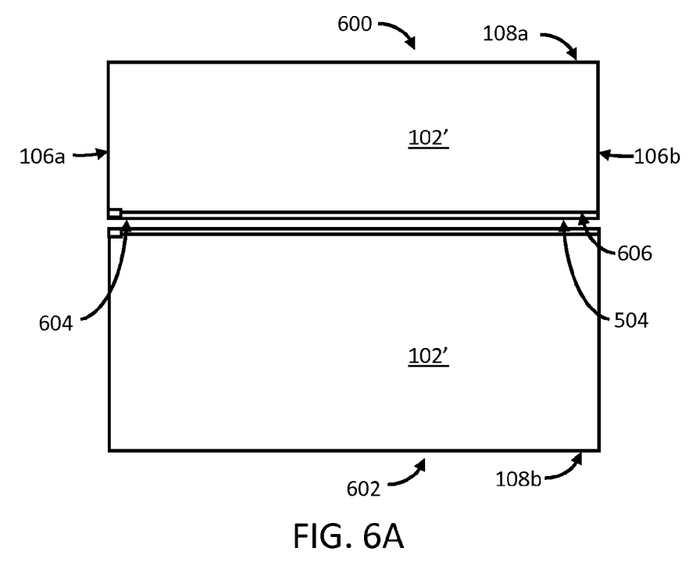
FIG. 6A is a top plan view illustrating pieces of strengthened glass that have been separated from the substrate shown in FIG. 1 according to the processes exemplarily described with respect to FIGS. 2A-5.
Figure 6B:
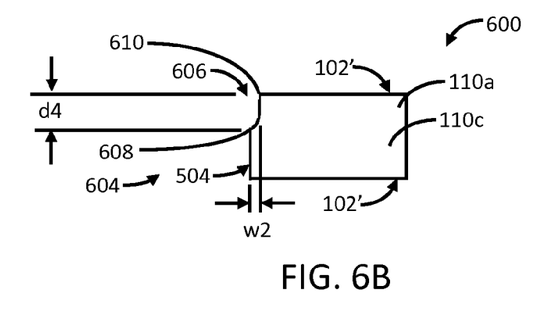
FIG. 6B is a side plan view illustrating a piece of strengthened glass shown in FIG. 6A.

FIG. 6A is a top plan view illustrating pieces of strengthened glass that have been separated from the substrate shown in FIG. 1 according to the processes exemplarily described with respect to FIGS. 2A-5. FIG. 6B is a side plan view illustrating a piece of strengthened glass shown in FIG. 6A.

Referring to FIGS. 6A and 6B, after the crack 500 propagates along the length of guide trench 200, the substrate 100 is fully separated into strengthened glass articles (also referred to herein as "articles") 600 and 602. Each article 600 or 602 can include a first surface 102' and a second surface 104' corresponding to the first surface 102 and second surface 104, respectively, of the substrate 100. Each article can further include an edge 604 obtained upon separating the substrate 100. Generally, the edge 604 can include the edge surface 504 and a notch region 606. The notch region 606 corresponds to the portions of the substrate 100 that were exposed to guide trench 200, the initiation trench 400 or a combination thereof. Accordingly, the notch region 606 extends from an edge 608 of the edge surface 504 and an edge 610 of the first surface 102'. The notch region 606 may have a depth d4 that is greater than, less than, or equal to any of depths d2 or d3. In one embodiment, d4 may be substantially equal to d2 or d3. Generally, d4 can be measured as the distance between edges 608 and 610 along a direction that is at least substantially perpendicular to the first surface 102' (or second surface 104') or along a direction that is at least substantially parallel to the edge surface 504. Similarly, the notch region 606 may have a width w2 that is greater than, less than, or equal to width w1. In one embodiment, w2 may be substantially 50% of w1. Generally, w2 can be measured as the distance between edges 608 and 610 along a direction that is at least substantially perpendicular to the edge surface 504 or along a direction that is at least substantially parallel to the first surface 102' (or second surface 104').

Figure 7:
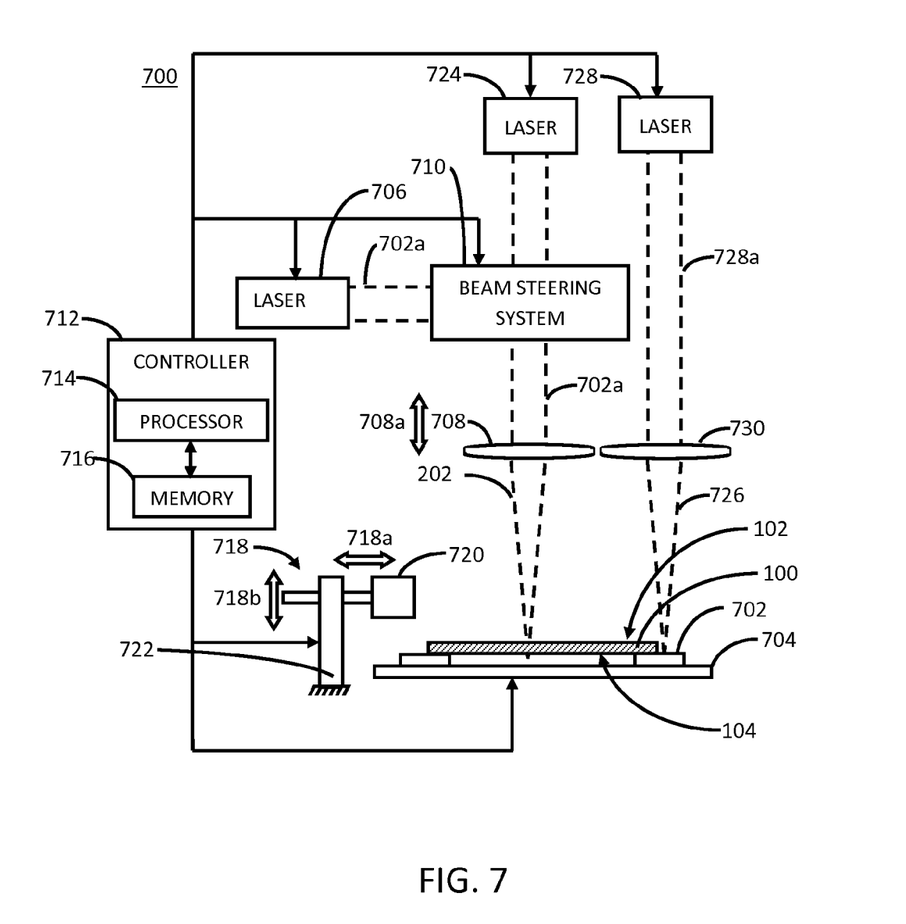
FIG. 7 schematically illustrates one embodiment of an apparatus configured to perform the processes exemplarily described with respect to FIGS. 2A-6B.

Strengthened glass articles, such as article 600 or 602, can be used as protective cover plates (as used herein, the term "cover plate" includes a window, or the like) for display and touch screen applications such as, but not limited to, portable communication and entertainment devices such as telephones, music players, video players, or the like; and as a display screen for information-related terminals (IT) (e.g., portable computer, laptop computer, etc.) devices; as well as in other applications. It will be appreciated that the articles 600 and 602 exemplarily described above with respect to FIGS. 6A and 6B may be formed using any desired apparatus. FIG. 7 schematically illustrates one embodiment of an apparatus configured to perform the processes exemplarily described with respect to FIGS. 2A-6B.

Referring to FIG. 7, an apparatus, such as apparatus 700, can separate a strengthened glass substrate such as substrate 100. The apparatus 700 may include a workpiece positioning system and a laser system.

Generally, the workpiece support system is configured to support the substrate 100 such that the first surface 102 faces toward the laser system and such that the beam waist is locatable relative to the substrate 100 as exemplarily described above with respect to FIG. 2B. As exemplarily illustrated, the workpiece support system can include a chuck such as chuck 702 configured to support the substrate 100 and a movable stage 704 configured to move the chuck 702. The chuck 702 can be configured to contact only a portion of the second surface 104 of substrate 100 (as illustrated) or may contact all of the second surface 104. Generally, the moveable stage 704 is configured to move the chuck 702 laterally relative to the laser system. Thus the moveable stage 704 can be operated to cause the beam waist to be scanned relative to the substrate 100.

Generally, the laser system is configured to direct a beam such as the aforementioned beam 202 along an optical path (wherein the beam 202 has a beam waist as exemplarily described above with respect to beam waist 204). As exemplarily illustrated, the laser system may include a laser 706 configured to produce a beam 702a of laser light and an optical assembly 708 configured to focus the beam 702a to produce the beam waist 204. The optical assembly 708 may include a lens and may be moveable along a direction indicated by arrow 708a to change the location (e.g., along a z-axis) of the beam waist of the beam 202 relative to the substrate 100. The laser system may further include a beam steering system 710 configured to move the beam waist of the beam 202 laterally relative to the substrate 100 and the workpiece support system. In one embodiment, the beam steering system 710 can include a galvanometer, a fast steering mirror, an acousto-optic deflector, an electro-optic deflector or the like or a combination thereof. Thus the beam steering system 710 can be operated to cause the beam waist to be scanned relative to the substrate 100.

The apparatus 700 may further include a controller 712 communicatively coupled to one or more of the components of the laser system, to one or more of the components of the workpiece support system, or a combination thereof. The controller may include a processor 714 and a memory 716. The processor 714 may be configured to execute instructions stored by the memory 716 to control an operation of at least one component of the laser system, the workpiece support system, or a combination thereof so that the embodiments exemplarily described above with respect to FIGS. 1 to 5 can be performed.

Generally, the processor 714 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, processor 714 includes a programmable microcontroller microprocessor, or other processor that can include one or more processing units arranged to execute instructions stored in memory 716 in accordance with the operating logic. Memory 716 can include one or more types including semiconductor, magnetic, and/or optical varieties, and/or may be of a volatile and/or nonvolatile variety. In one embodiment, memory 716 stores instructions that can be executed by the operating logic. Alternatively or additionally, memory 716 may store data that is manipulated by the operating logic. In one arrangement, operating logic and memory are included in a controller/processor form of operating logic that manages and controls operational aspects of any component of the apparatus 700, although in other arrangements they may be separate.

In one embodiment, the controller 712 may control an operation of one or both the laser system and the workpiece positioning system to form the initiation trench 400 using the laser 706. In another embodiment, the controller 712 may control an operation of at least one of the laser system, the workpiece positioning system and a vent crack initiator system to form the initiation trench 400.

In one embodiment, a vent crack initiator system such as vent crack initiator system 718 may be included within the apparatus 700. The vent crack initiator system 718 can include a vent crack initiator device 720 operative to form the aforementioned initiation trench 400. The vent crack initiator device 720 may be coupled to a positioning assembly 722 (e.g., a dual-axis robot) configured to move the vent crack initiator device 720 (e.g., along a direction indicated by one or both of arrows 718*a* and 718*b*). The vent crack initiator device 720 may include a grinding wheel, a cutting blade, a laser source, an etchant nozzle or the like or a combination thereof. In another embodiment, another vent crack initiator system may include a laser, such as laser 724, operative to generate a beam of light and direct the beam of light into the aforementioned laser system facilitate formation of the initiation trench 400. In yet another embodiment, another vent crack initiator system may include a supplemental laser system configured to generate a beam 726 of laser light sufficient to form the initiation trench 400 as exemplarily described above. Accordingly, the supplemental laser system can include a laser 728 operative to generate a beam 728*a* of light an optical assembly 730 configured to focus the beam 728*a* direct the beam 726 to the substrate 100.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. For example, it will be appreciated that subject matter of any sentence or paragraph can be combined with subject matter of some or all of the other sentences or paragraphs, including combinations with any subject matter of some or all of sentences or paragraphs from the incorporated U.S. patent application Ser. No. 14/033,368, except where such combinations are mutually exclusive. The invention is defined by the following claims, with equivalents of the claims to be included therein.

What is claimed is:

1. A method, comprising:
providing a substrate of strengthened glass; wherein the strengthened glass comprises thermally strengthened glass or chemically strengthened glass; wherein the strengthened glass has a first surface and a second surface opposite the first surface; wherein the strengthened glass includes a compression region extending from the first surface into an interior of the strengthened glass and a tension region adjacent to the compression region; wherein the compression region has a thickness greater than 10 µm and a compressive stress greater than 69 MPa;
employing a pre-machining enhancement process to generate a plurality of free electrons at a first region of the first or second surface of the substrate, wherein the pre-machining enhancement process comprises arranging the first region of the first or second surface adjacent to a donor object, removing donor material from the donor object, and introducing the removed donor material to the substrate;
generating a beam of laser light;
directing the beam of laser light along an optical path to pass through the first surface and to pass through the second surface after passing through the first surface, and focusing the beam of laser light to produce a beam waist at an elevation relative to the first or second surface, and wherein the beam of laser light has an intensity and a fluence in a spot at the first or second surface of the substrate sufficient to ablate a portion of the substrate;
scanning the beam of laser light along a guide path to remove material from one of the first or second surface to form a guide trench extending along the guide path in the one of the first or second surfaces, wherein the pre-machining enhancement process precedes and is different from the step of scanning that removes material from the substrate, and wherein the first region has an area that is greater than or equal to the area of the material removed at the first or second surface of the substrate; and
separating the substrate along the guide path.

2. The method of claim 1, wherein the strengthened glass substrate has a thickness less than 10 mm; wherein directing the beam of laser light includes directing at least one pulse of the laser light, the at least one pulse having a pulse duration less than 500 nanoseconds (ns); wherein a diameter of the spot is greater than 1 µm and is less than 100 µm; wherein the beam of laser light includes a green wavelength; wherein the beam waist is spaced apart from the substrate by a distance less than 3 mm; wherein a depth of the guide trench is less than 50 µm; wherein the beam of laser light is scanned along the guide path at a scan rate greater than 1 m/s; and wherein the beam of laser light is scanned along portions of the guide path at least 5 times.

3. The method of claim 2, wherein the guide trench is formed in the second surface.

4. The method of claim 1, further comprising removing material from the second surface to form a guide trench extending along the guide path.

5. The method of claim 1, wherein the laser beam is scanned along the guide path multiple times to form the guide trench, and wherein the guide trench is formed in the second surface.

6. The method of claim 5, wherein the guide trench has a depth that is 5% to 100% greater than the thickness of the compression region.

7. The method of claim 6, wherein the beam of laser light includes a green wavelength.

8. The method of claim 7, wherein the guide trench has a depth that is 25% to 75% greater than the thickness of the compression region.

9. A method, comprising:
   providing a substrate of strengthened glass, wherein the strengthened glass comprises thermally strengthened glass or chemically strengthened glass, wherein the strengthened glass has a first surface and a second surface opposite the first surface, wherein the strengthened glass substrate has a thickness less than 10 mm, wherein the strengthened glass includes a compression region extending from the first surface into an interior of the strengthened glass and a tension region adjacent to the compression region, wherein the compression region has a thickness greater than 10 µm and a compressive stress greater than 69 MPa;
   generating a beam of laser light, wherein the beam of laser light includes a green wavelength;
   directing the beam of laser light along an optical path to pass through the first surface and to pass through the second surface after passing through the first surface, and focusing the beam of laser light to produce a beam waist at an elevation relative to the first or second surface, and wherein the beam of laser light has an intensity and a fluence in a spot at the first or second surface of the substrate sufficient to ablate a portion of the substrate, wherein a diameter of the spot is greater than 1 µm and is less than 100 µm, wherein directing the beam of laser light includes directing at least one pulse of the laser light, the at least one pulse having a pulse duration less than 500 nanoseconds (ns), wherein the beam waist is spaced apart from the substrate by a distance less than 3 mm;
   scanning the beam of laser light along a guide path to remove material from one of the first or second surface to form a guide trench extending along the guide path in the one of the first or second surfaces, wherein the beam of laser light is scanned along the guide path at a scan rate greater than 1 m/s, wherein the beam of laser light is scanned along portions of the guide path multiple times to form the guide trench; and
   separating the substrate along the guide path.

10. The method of claim 9, wherein the beam waist is closer to the second surface than the first surface.

11. The method of claim 9, wherein the strengthened glass comprises at least one of a borosilicate glass, a soda-lime glass, an aluminosilicate glass, or an aluminoborosilicate glass, and wherein the strengthened glass is strengthened by an ion exchange chemical strengthening process, thermal tempering, or a combination thereof.

12. The method of claim 9, wherein the beam waist is spaced apart from the substrate by a distance greater than 0.5 mm.

13. The method of claim 9, wherein the compressive stress is greater than 600 MPa.

14. The method of claim 9, wherein the thickness of the compression region is greater than 100 µm.

15. The method of claim 9, wherein a depth of the guide trench is greater than or equal to the thickness of the compression region.

16. The method of claim 9, wherein a depth of the guide trench is less than the thickness of the compression region.

17. The method of claim 9, wherein a depth of the guide trench is greater than 70% of the thickness of the compression region.

18. The method of claim 9, wherein a depth of the guide trench is greater than 30 µm.

19. The method of claim 9, wherein the laser beam further comprises an intensity and a fluence in a spot at a surface of the substrate sufficient to stimulate multiphoton absorption of light within the laser beam by the substrate.

20. The method of claim 9, further comprising scanning the beam of laser light along portions of the guide path at least 10 times.

21. The method of claim 9, wherein the guide trench is formed in one of the first surface or the second surface and includes an end spaced apart from an edge of the first surface or the second surface.

22. The method of claim 9, wherein the guide trench is formed in one of the first surface or the second surface, and wherein at least a portion of the guide trench extends in a curved line along the first surface or the second surface.

23. The method of claim 9, wherein the guide trench is configured such that substrate remains united upon forming the guide trench, wherein separating the substrate comprises forming a vent crack within the substrate after forming the guide trench and wherein the vent crack and the guide trench are configured such that the substrate is separable along the guide trench upon forming the vent crack.

24. The method of claim 23, wherein forming the vent crack comprises directing laser radiation onto the substrate, wherein the laser radiation has a radiation waist that is at least partially coincident with the substrate.

25. The method of claim 23, wherein forming the vent crack comprises mechanically impacting the substrate, and wherein mechanically impacting the substrate comprises employing at least one of a grinding wheel, a cutting blade, a laser source, and an etchant nozzle.

26. The method of claim 9 further comprising forming an initiation trench in the substrate, wherein a length of the initiation trench is less than a length of the guide trench, and wherein the initiation trench extends into the tension region.

27. The method of claim 9, comprising:
   employing a pre-machining enhancement process to generate a plurality of free electrons at a first region of the first or second surface of the substrate, wherein the pre-machining enhancement process precedes and is different from the step of scanning that removes material from the substrate, wherein the first region has an area that is greater than or equal to the area of the material removed at the first or second surface of the substrate, and wherein the pre-machining enhancement process comprises: arranging the first region of the first or second surface adjacent to a donor object; removing donor material from the donor object; and
   introducing the removed donor material to the substrate.

28. The method of claim 9, further comprising:
employing a pre-machining enhancement process to generate a plurality of free electrons at a first region of the first or second surface of the substrate, wherein the pre-machining enhancement process precedes and is different from the step of scanning that removes material from the substrate, wherein the first region has an area that is greater than or equal to the area of the material removed at the first or second surface of the substrate, and wherein the pre-machining enhancement process modifies the surface roughness of the first region of the first or second surface.

29. The method of claim 28, wherein the pre-machining enhancement process increases the surface roughness at the first or second surface within the first region.

30. The method of claim 9, further comprising:
employing a pre-machining enhancement process to generate a plurality of free electrons at a first region of the first or second surface of the substrate, wherein the pre-machining enhancement process precedes and is different from the step of scanning that removes material from the substrate, wherein the first region has an area that is greater than or equal to the area of the material removed at the first or second surface of the substrate, and wherein the pre-machining enhancement process comprises at least one of laser processing, electron beam processing, chemically etching, sputter etching, and mechanically abrading the first region of the first or second surface to modify a surface morphology of the first region of the first or second surface.

31. The method of claim 9, further comprising:
employing a pre-machining enhancement process to generate a plurality of free electrons at a first region of the first or second surface of the substrate, wherein the pre-machining enhancement process precedes and is different from the step of scanning that removes material from the substrate, wherein the first region has an area that is greater than or equal to the area of the material removed at the first or second surface of the substrate, and wherein the enhancement region is configured to stimulate non-linear absorption of the laser energy by the portion of the workpiece.

32. The method of claim 9, further comprising:
employing a pre-machining enhancement process to generate a plurality of free electrons at a first region of the first or second surface of the substrate, wherein the pre-machining enhancement process precedes and is different from the step of scanning that removes material from the substrate, wherein the first region has an area that is greater than or equal to the area of the material removed at the first or second surface of the substrate, wherein the laser light directed onto the substrate is second laser light, wherein the plurality of free electrons at the first region are generated by directing first laser energy onto the workpiece, wherein the first laser light is distinct from the second laser light, wherein the first laser light has a wavelength, wherein the substrate is transparent to the wavelength of the first laser light, wherein the first laser light has a beam waist that is located outside of the substrate, and wherein the first laser light has an intensity greater than $10^{12}$ W/cm$^2$.

33. The method of claim 9, wherein the guide trench is formed in the second surface.

34. The method of claim 33, wherein the strengthened glass substrate has a thickness greater than 200 μm.

35. The method of claim 33, wherein the strengthened glass substrate has a thickness smaller than 200 μm.

36. The method of claim 33, wherein the guide trench has a depth that is 5% to 100% greater than the thickness of the compression region.

37. The method of claim 33, wherein the guide trench has a depth that is 25% to 75% greater than the thickness of the compression region.

38. A method, comprising:
providing a substrate of strengthened glass; wherein the strengthened glass comprises thermally strengthened glass or chemically strengthened glass; wherein the strengthened glass has a first surface and a second surface opposite the first surface; wherein the strengthened glass includes a compression region extending from the first surface into an interior of the strengthened glass and a tension region adjacent to the compression region; wherein the compression region has a thickness greater than 10 μm and a compressive stress greater than 69 MPa;
employing a pre-machining enhancement process to generate a plurality of free electrons at a first region of the first or second surface of the substrate, wherein the pre-machining enhancement process introduces negatively charged ions into the first region by one of ion implantation or diffusion;
generating a beam of laser light;
directing the beam of laser light along an optical path to pass through the first surface and to pass through the second surface after passing through the first surface, and focusing the beam of laser light to produce a beam waist at an elevation relative to the first or second surface, and wherein the beam of laser light has an intensity and a fluence in a spot at the first or second surface of the substrate sufficient to ablate a portion of the substrate;
scanning the beam of laser light along a guide path to remove material from one of the first or second surface to form a guide trench extending along the guide path in the one of the first or second surfaces, wherein the pre-machining enhancement process is different from the step of scanning that removes material from the substrate, and wherein the first region has an area that is greater than or equal to the area of the material removed at the first or second surface of the substrate; and
separating the substrate along the guide path.

* * * * *